J. H. BAILEY.
ANTI-SUCKING BIT FOR CALVES, &c.
No. 169,670. Patented Nov. 9, 1875.
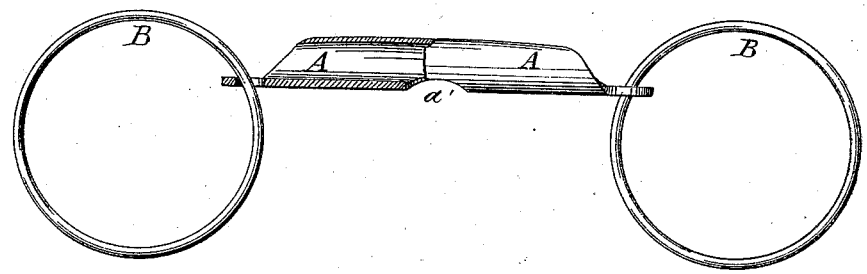

UNITED STATES PATENT OFFICE.

JOHN H. BAILEY, OF TOLEDO, IOWA.

IMPROVEMENT IN ANTI-SUCKING BITS FOR CALVES, &c.

Specification forming part of Letters Patent No. 169,670, dated November 9, 1875; application filed August 28, 1875.

*To all whom it may concern:*

Be it known that I, JOHN H. BAILEY, of Toledo, in the county of Tama and State of Iowa, have invented a new and useful Improvement in Anti-Sucking Bit for Cows, Calves, and Colts, of which the following is a specification:

The figure is a side view of my improved bit, partly in section, to show the construction.

The invention consists in a tubular bit, having open ends in communication with the external air, and an opening located inside of the mouth, so that when the animal attempts to suck, air only will be drawn in through the bit.

A is a tube, open and beveled at its ends, and with a hole, $a^1$, through the middle part of its longer side. The side of the bit A in which the hole $a^1$ is formed has holes or eyes $a^2$ formed in its projecting ends to receive the rings B, by which the bit is secured in the mouth of a cow, calf, or colt.

The function of the open-end bit, having an opening or perforation in its middle portion, is to prevent the animal from sucking milk, for it will be seen that, by making a connection with the external air at the sides of the mouth, air only will be drawn in when the animal attempts to suck.

I am aware that a weaning-bit has been made tubular, and provided with side slits extending out to the ends; but

What I claim is—

A tubular suction-bit, open at each end, closed in front, and on the inside provided with hole $a^1$, as shown and described, to allow the air ingress and egress from each end, and the animal to eat without clogging the tube with food.

JOHN H. BAILEY.

Witnesses:
 THEO. SCHAEFFER,
 G. E. HEDGE.